July 10, 1928.
P. R. BUNDY
1,676,684
RIM LOCK
Filed May 24, 1927
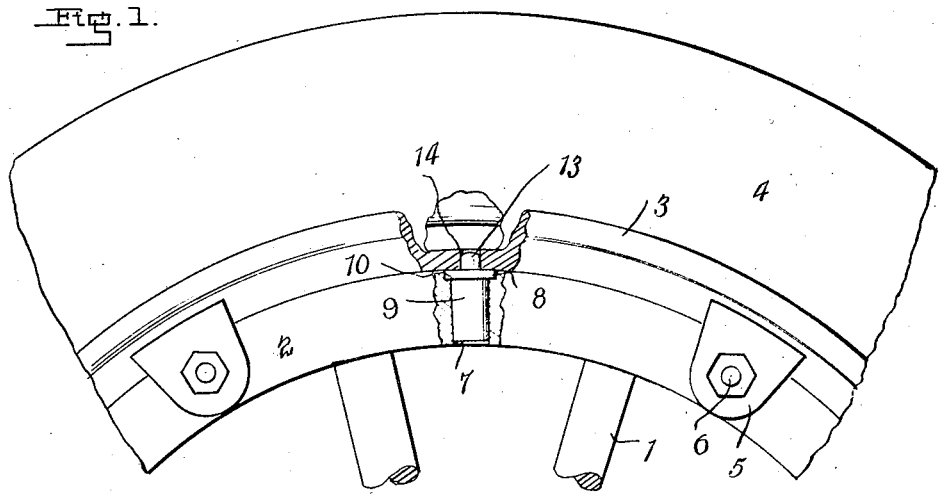
Inventor
P. R. Bundy
By Lacey & Lacey, Attorneys Patented July 10, 1928.

1,676,684

UNITED STATES PATENT OFFICE.

PHILANDER R. BUNDY, OF INDIANAPOLIS, INDIANA.

RIM LOCK.

Application filed May 24, 1927. Serial No. 193,901.

This invention is a device for locking a tire carrying rim to the felly of a vehicle wheel, the primary object of the invention being to provide a simple device by the use of which the rim will be so held to the felly that efforts of unauthorized persons to remove the rim will be foiled. The invention also has for its object the provision of a device which can be manufactured at a low cost and which, when applied to a wheel, will be disposed entirely within the lines of the felly so that it will not detract from the appearance of the wheel, and a further object of the invention is to provide a locking device of such construction that it may contain a lubricant whereby the effects of corrosion will be avoided. The invention is illustrated in the accompanying drawing and will be hereinafter fully described, the novel features being particularly pointed out in the appended claims.

In the drawing:

Figure 1 is an elevation, partly broken away and in section, of a portion of a vehicle wheel having the invention applied thereto;

Fig. 2 is an enlarged longitudinal section of one embodiment of the invention;

Fig. 3 is a similar view showing a slightly different embodiment of the invention;

Figs. 4 and 5 are detail plan views of guard rings which may be employed, and

Fig. 6 is a detail of one form of key which may be employed.

In the drawing, the reference numeral 1 indicates a portion of the spokes of a wheel, 2 designates a portion of the felly, 3 indicates a portion of the metal rim and 4 designates a portion of the tire. These parts may all be of any approved construction, the rim being shown as secured upon the felly by lugs 5 and clamping bolts 6 in a well known manner.

In carrying out the present invention, an opening 7 is formed through the felly and the said opening is countersunk at its outer end, as indicated at 8. Ordinarily, only one of these openings will be provided as a greater number will not be necessary but, of course, if it be preferred to employ more than one lock in any instance, any desired number may be provided. A sleeve or tube 9 is fitted in the opening 7 and should be of such diameter as to fit snugly therein, being provided at its outer end with an annular flange 10 fitting within the countersunk portion 8 so that the outer end of the tube will be flush with the outer circumference of the felly and will have a firm bearing in the felly. The bore of the tube 9 is threaded for the greater portion of its length, as indicated at 11 in Fig. 2, and engaged within the threaded bore at the outer end of the tube is a bolt 12 which is externally threaded, as shown, and has a teat or axially projecting lug 13 at its outer end adapted to engage in an opening 14' provided therefor in the rim 3. The inner end of the bolt is constructed to be engaged by a setting key and in the drawing is shown as constructed with a socket 14, the walls of which may be given any desired contour and the key, of course, will have a corresponding configuration at one end. The drawing shows a socket of an irregular hexagonal shape and the key 15 is provided with a corresponding head 16 at one end. The exact conformation of the key and the socket, however, is not material, it being the intention to provide an irregular formation so that a standard key will not be adapted to fit the bolt and consequently the efforts of thieves to remove the tire will be frustrated. The key, at its opposite end, is provided with longitudinal grooves 17 and a longer groove 17' the purpose of which will presently appear. I also provide in the inner end of the tube 9 a guard ring 18 which is threaded into the tube and is provided in its inner surface or bore with lugs or ribs 19 which will be so disposed as to resist the insertion of a key not having the proper form to engage the socket 14. There is also provided a second collar or guard 20 which is so mounted within the tube 9 that it cannot be removed and this collar or guard is provided with a lug 21 on its inner circumference to also resist the entrance of a standard key or any key not having the proper form. A ring 22 is fitted in the inner end of the tube 9 and is preferably welded thereto so that it will be permanently anchored and the bore of this ring or guard is threaded, as indicated at 23, whereby it may receive a cap so that the entrance of water or dampness to the interior of the lock will be resisted. The provision of a cap (not shown) to fit within the threaded bore of this guard 22 also permits me to insert grease into the lock after it has been set so that corrosion of the parts will be resisted and the lock will always be in operative condition. The grease, of course, will be retained within the lock by the cap fitted in the threaded bore 23 of the guard.

The operation of the lock will be readily understood. When the rim is to be removed, the proper key is inserted through the inner end of the tube or casing 9 and engaged with the inner end of the bolt 12 so that the bolt may be rotated and the teat 13 withdrawn from the rim, after which the rim may be removed in the usual manner. When the rim has been replaced, the bolt, of course, is again projected so that its working end will engage the opening in the rim and thereby lock the rim in its proper position on the felly.

Upon reference to Fig. 5, it will be noted, that the guard ring 18 has six lugs 19, and it will be understood that the lugs are arranged so as to, in effect, define a bore or passage corresponding in cross sectional contour to the socket 14 in the bolt so that a key not having the proper form cannot pass to the bolt. The ring or collar 20 is held against movement longitudinally of the sleeve 9 by the anchored ring 22 and by the shoulder presented by the inner terminal of the threads 11 but it may rotate. Assuming the bolt to have been projected as shown in Fig. 2, the grooved end of the key is inserted through the ring 22 so that the groove 17' will engage the rib or lug 21 and is then rotated until the grooves 17 register with and may engage the lugs or ribs 19, whereupon the continued rotation of the key will cause the ring 18 to rotate with the result that said ring will travel outwardly in the sleeve 9 by reason of its threaded engagement therewith. The ring 18 will thus be turned home against the inner end of the bolt and constitute a lock nut to prevent release of the bolt from the rim. Obviously, to withdraw the bolt, the key must be inserted to engage the ring 18 and return it to its initial position shown in Fig. 2 and this can be done only with a proper key. After the guard ring has been thus retracted, the key is manipulated to engage and withdraw the bolt.

The device shown in Figs. 1 and 2 is intended particularly for use in wooden fellies. In Fig. 3, I have shown the device adapted for use in a metal felly and the difference resides in providing the outer tube or casing 25 with an annular flange 26 at its inner end instead of at its outer end and providing threads 27 upon the exterior of the tube. The tube is inserted outwardly through the rim and the opening through which it is inserted is interiorly threaded so that the threaded engagement will aid in holding the tube in place. The length of the tube should be the same as the thickness of the rim and the rim should be countersunk so that a nut 28 threaded onto the outer end of the tube may be turned home against the felly and will lie flush with the outer circumference thereof. The bolt 12 and the members 18, 20 and 22 are the same as in the previously described form and illustrated in Fig. 2.

Having thus described the invention, I claim:

1. A rim lock comprising a tubular body adapted to be secured in a wheel felly and having a threaded bore, a bolt having threaded engagement with the bore of the body, and a guard ring also having threaded engagement with the bore of the body whereby it may be turned home against the bolt.

2. A rim lock comprising a tubular body adapted to be secured in a wheel felly and having a threaded bore, a bolt having threaded engagement with the bore of the body, a guard ring also having threaded engagement with the bore of the body whereby it may be turned home against the bolt, and a second guard ring rotatable in the body between the first guard ring and the entrance end of the body and held against movement longitudinally of the body.

3. A rim lock comprising a tubular body adapted to be secured in a wheel felly and having a threaded bore, a bolt having threaded engagement with the bore of the body and having a key-receiving socket in its inner end, a guard ring also having threaded engagement with the bore of the body whereby it may be turned home against the bolt, said ring having spaced lugs on its inner circumference defining a bore having the same contour as the socket in the bolt, and a second guard ring rotatable in the body between the first guard ring and the entrance end of the body and held against movement longitudinally of the body, said second guard ring having a single lug on its inner circumference.

In testimony whereof I affix my signature.

PHILANDER R. BUNTY. [L. S.]